United States Patent [19]
Patecell

[11] Patent Number: 5,000,241
[45] Date of Patent: Mar. 19, 1991

[54] UNITARY BEAD-LOCK AND RUN-FLAT ROLLER SUPPORT RING FOR PNEUMATIC TIRES ON TWO-PART WHEELS

[76] Inventor: Theodore C. Patecell, 33-52 156th St., Flushing, N.Y. 11354

[21] Appl. No.: 349,305

[22] Filed: May 9, 1989

[51] Int. Cl.$^5$ .................................... B60C 17/00
[52] U.S. Cl. ................... 152/382; 152/381.5; 152/520
[58] Field of Search ............... 152/379.2, 379.4, 379.5, 152/381.3, 381.4, 382, 383, 396, 516, 520

[56] References Cited

U.S. PATENT DOCUMENTS

| | | | |
|---|---|---|---|
| 4,216,810 | 8/1980 | Osada et al. ................... | 152/520 X |
| 4,304,282 | 12/1981 | Watts ............................ | 152/381.6 |
| 4,327,791 | 5/1982 | Strader ......................... | 152/520 X |
| 4,393,911 | 7/1983 | Winfield ....................... | 152/520 X |
| 4,467,852 | 8/1984 | Ippen et al. .................. | 152/520 X |
| 4,662,419 | 5/1987 | Winfield ....................... | 152/400 X |
| 4,823,854 | 4/1989 | Payne et al. .................. | 152/392 |

*Primary Examiner*—Russell D. Stormer
*Attorney, Agent, or Firm*—Howard E. Thompson, Jr.

[57] ABSTRACT

A unitary, essentially cylindrical, rigid closed ring member is provided for use with pneumatic tires having spaced mounting beads at the inner diameter for engagement with edge flanges of a circumferentially divided two-part wheel rim, the wheel rim providing an essentially flat central bearing surface joining the flanges in bead receiving portions which may be angled 5° or 15° from the horizontal; the ring member having an outside diameter approximately ⅜" greater than the inside diameter of the tire beads, an edge thickness of about ¼" for engagement with inner surfaces of the tire beads, and a width such as to firmly support the tire beads in engagement with the rim flanges when the wheel is fully assembled, the central portion of the ring having a smooth inner surface for close engagement with the bearing surface of the wheel, and the outer surface of the ring having a central annular depression track about ¼" deep, and of a width to freely and rotatably receive a run-flat support ring comprising a plurality of arcuate members assembled in end-to-end relation.

18 Claims, 2 Drawing Sheets

UNITARY BEAD-LOCK AND RUN-FLAT ROLLER SUPPORT RING FOR PNEUMATIC TIRES ON TWO-PART WHEELS

This invention relates to a unitary rigid ring device for insertion within the tire when assembling the same to a two-part circumferentially divided wheel to provide in the assemblage close circumferential bearing support on the wheel, transverse bearing support to hold the tire beads in firm engagement with the wheel rim flanges, and circumferential support means for a run-flat roller comprising a plurality of arcuate sections joined in end-to-end relation. The device is particularly adapted for use with the relatively thin-walled broad tread tires of the so-called "flotation" type providing enhanced traction when encountering mud, sand, and rough terrain.

The run-flat roller unit to be used with the device involving a plurality of arcuate members joined in end-to-end relation is preferably of the type disclosed in my prior patents U.S. Pat. No. 3,635,273 and RE No. 28,196 wherein the arcuate members are fashioned from plastic material having pivotal end portions bolted together to form a ring assembly. This type of run-flat support, which freely rotates about the wheel during run-flat operation, has proved highly effective in compensating for the difference between tread circumference and roller circumference as the tire tread is fed past the point of load bearing during run-flat operation. In this way vehicles can travel many miles on deflated tires without damage to the tire, provided the tire beads remain seated against the rim flanges.

The importance of maintaining the bead-seating has long been recognized as a means for preventing damage to the tire, and more importantly, maintaining traction between the wheel and tire during periods of acceleration and braking. Past efforts to assure such bead-seating have, however, left much to be desired. In U.S. Pat. No. 4,173,243 issued Nov. 6, 1979, the provision of bead-seating and support for a rotatable run-flat member is provided by a plurality of components to be assembled within the tire when mounting on a two-piece wheel. One version as disclosed employs two circular rings collectively providing a guide support for the run-flat member, with supplemental circular members disposed between the first assemblage and the tire beads. In a modified structure disclosed in this patent the guide for the run-flat member is fashioned from arcuate members joined in end-to-end relation It is apparent that these approaches are impractical, both because of the problem of dimensional tolerances in the several components, and the difficult and intricate procedures of assembling the parts within a wheel-tire assemblage.

In U.S. Pat. No. 4,393,911 issued July 19, 1983 (opposed and reissued as RE No. 32,693), there is disclosed a C-shaped flexible band of bearing material intended to provide support for a run-flat member while at the same time maintain bead-seating. The flexibility of the C-shaped band, intended to facilitate insertion and removal of the band with respect to the tire casing, makes it difficult to provide at the same time the needed bearing engagement with the wheel and rotatable engagement with the run-flat assemblage of arcuate sections joined in end-to-end relation. The patentee attempts to solve this problem with intricate means for adjusting the interengagement of the arcuate sections to change the size (circumferencial dimension) of the run-flat assemblage, but this is counter-productive in several ways.

The intricate adjustments make the joints susceptible to damage during rough run-flat operation. The altering of the circumferential dimension of the assemblage of preformed arcuate sections inherently modifies the type of bearing engagement established with the C-shaped member. And the adjustments necessary are both time consuming and subject to error, as depending wholly on the skill of the mechanic in making the adjustments.

Furthermore this patent, in FIG. 2, shows the C-shaped ring member as fitting loosely between the tire beads, thus in no way suggesting the concept of forceably clamping the tire beads against the wheel rim flanges.

In U.S. Pat. No. 2,040,645 issued May 12, 1936 the FIG. 1 showing is remotely related to the present invention in that it includes an annular member, sealably fitting between tire beads, in bearing engagement with a mounting rim, and having a track for rotatably supporting a run-flat assemblage. It must be noted, however, that this patent relates to ancient, narrow tires on a split and radially contractable rim. It is apparent from the drawing that the space between the rim flanges is more than half occupied by the tire beads, and less than half by the annular, bead engaging member. Such limited disclosure gives no hint as to how the broad objectives might be accomplished with the modern "flotation" type tire, in which the space between the beads, as mounted, is almost four times the combined bead width.

Another patent of general interest is U.S. Pat. No. 4,327,794 directed to Safety Tire and Wheel Assembly. This patent discloses arcuate tire inserts coupled together to form a ring with the sections having a modified "I" shaped cross section with a relatively broad upper crosshead for engagement with a deflated tire tread, and a broader bottom crosshead for transverse bearing against the mounted tire beads. According to the patent disclosure the upper crosshead is provided with a shallow annular channel for receiving a circumferentially extendable band member protruding beyond the outer surface of the crosshead and intended to slide circumferentially of the assemblage during run-flat operation.

The patent is silent as to how one would be able to mount such an extendable band member after the arcuate members had been assembled within the tire. Even assuming that it is possible to properly mount and locate the band member, such a circumferentially extendable band member would be rapidly torn apart during run-flat operation as the much larger diameter tire tread is passed by the load bearing area in run-flat operation. Indeed, known attempts to use this structure have omitted the band member so that the tire must slide directly on the stationary upper crosshead during run-flat operation, creating a tremendous frictional heat build-up. Thus, the structure disclosed in this patent provides no practical solution to the overall problem being addressed.

THE INVENTION

In accordance with the present invention, a unitary, essentially cylindrical closed ring member is provided for use with pneumatic tires having spaced mounting beads at the inner diameter for engagement with edge flanges of a circumferentially divided two-part wheel rim, the wheel rim providing an essentially flat central bearing surface joining the flanges in bead receiving portions which are angled at 5° or 15° from the horizontal according to wheel and rim association specifications; the ring member having an outside diameter approximately ⅜" greater than the inside diameter of the tire beads, an edge thickness of about ¼" for engagement with inner radial surfaces of the tire beads, and a width such as to firmly support the tire beads in engagement with the rim flanges when the wheel is fully assembled, the central portion of the ring having a smooth inner surface for close engagement with the bearing surface of the wheel, and the outer surface of the ring having a central annular rectangular depression track about ¼" deep, and of a width to freely and rotatably receive a run-flat support ring comprising a plurality arcuate members assembled in end-to-end relation.

The novel ring member of the present invention, while useable with standard tires, is particularly adapted for use with broad tread, thin-walled "flotation" type tires that provide enhanced traction on sand, mud and rough terrain when mounted on circumferentially divided two-part wheels to be equipped with a rotatable run-flat assemblage permitting continued use when the tire becomes deflated. Extended run-flat operation with maintained accelerating and braking traction is only possible so long as the tire beads remain in firm engagement with the bead retaining flanges of the wheel rim, and as the bead engaging surfaces of the rim are frequently angled at 15° from the horizontal, this becomes difficult, once air pressure is lost. Annular humps in the wheel rim adjacent to the beads on flat or slightly tapered rims provide some protection if some air pressure remains in the tire, but are of little value when the tire is completely deflated and is being grossly distorted in the load bearing area, and are of no value on rims with a 15° taper.

What makes bead support particularly difficult with this type of tire is the wide spacing of the beads when mounted on the rim, almost four times as great as the combined thickness of the beads. Attempts in the past to employ multicomponent supports, such as the central run-flat assemblage guide and spacer rings of the general type shown in U.S. Pat. No. 4,173,243 above mentioned, have not proved satisfactory, particularly in the type testing to which such equipment is subjected by the military. Extended high speed run-flat driving over a rough terrain causes rapid damage to or destruction of one or more components of such multi-component installations.

What is needed to solve this problem is the structural integrity, that can be provided by a unitary closed metal ring insert that can provide the several support functions. The problem, however, is how to get a unitary ring of the needed width into the tire casing. This width is suitably about 6⅛ inches, for 8¼" wide rims, but differing according to different wheel designs, and tire bead widths. There is a limit to the extent to which the circular tire bead opening can be distorted to permit the maximum diameter of a wide ring member to pass through it.

I have now discovered that this problem can be solved by holding to a bare minimum the outside diameter of the ring member at the edges. It has been found through extensive testing that as little as a ¼" wide band of axial pressure against the inner periphery of the tire bead adjacent its edge is enough to maintain bead-seating during the roughest of run-flat driving conditions.

In thus forcing the bead edges against the 15° wheel incline and the rim flange, however, it is essential to avoid contact of the inner periphery of the ring edge with the inclined portion of the rim, as premature contact would prevent proper bead compression. It is preferable to provide about 1/16 inch clearance between the inner periphery of the ring edge and the wheel incline when the tire bead is compressively engaged. A ring diameter ⅜" greater than the inner bead diameter, and having radial edge surface ¼" wide will provide the needed 1/16" clearance; and a ring of such size can be forced through the bead opening of a tire. Once in the tire casing the ring can be rotated to fit between the tire beads, and readily moved about in that plane as will be discussed in the description of the drawing illustration.

One might think it impossible that an object having rectangular dimensions of 6⅜" by 16⅝" could be passed through the bead opening of a 16½ inch tire which has an actual diameter of only 16" at the inner edge or toe of the bead. It can be done, however, and a number of assemblages (wheel, tire, ring, and run-flat insert) are being prepared for testing by the military.

Another novel feature of the ring member is its lightweight construction. Fashioned from extruded aluminum alloy or magnesium the thickness throughout the major portion of the width need be only ⅛ inch, with 45° reinforcing chamfers at four places, i.e. along the edges of the ring and at both sides of the offset bearing portion. What makes this light weight structure possible is the maintaining of close tolerances in the slightly tapered bearing section which provides a close circumferential interfit with the bearing portion of the wheel member. With this close engagement it is as if the run-flat assemblage, riding in the depression track aligned with the bearing portion, is rotating directly on the wheel.

Because the ring must be readily assembled and disassembled with respect to the wheel, dimensional tolerances for the slightly tapered bearing sections must lean toward a slight clearance, rather than too tight a fit. To the extent that there may be slight clearance a slight tendency toward rotational creepage of the ring member may develop during run-flat operation, comparable to the relative rotation encountered with internal gear systems. In order to limit the extent of such creeping it is desirable to add, at the inner side of the assemblage, between the bearing surface and bead engaging portion of the wheel, a shallow lug on the wheel member and a registering lug on the ring member.

To facilitate assembly and disassembly of the parts, and also to facilitate slippage between the ring member and wheel if such creeping tendency is encountered, it is desirable to add lubricant to the wheel bearing surface before making the final assembly.

Because the novel ring member so effectively supports both the run-flat assemblage and the seating of the tire beads, the ring member will be suited for many heavy duty general and commercial applications.

As the novel ring member is considered to be a key element of a superior overall run-flat system, it is considered that the overall system employing the novel ring member becomes a patentable contribution to the art; and claims are being included which are directed to the overall system.

Novel features of the improved bead-lock and roller support ring will be more readily understood from a consideration of the accompanying drawing, in which details of the device are identified with suitable reference characters in the several views, and in which.

Figures 1, 2:
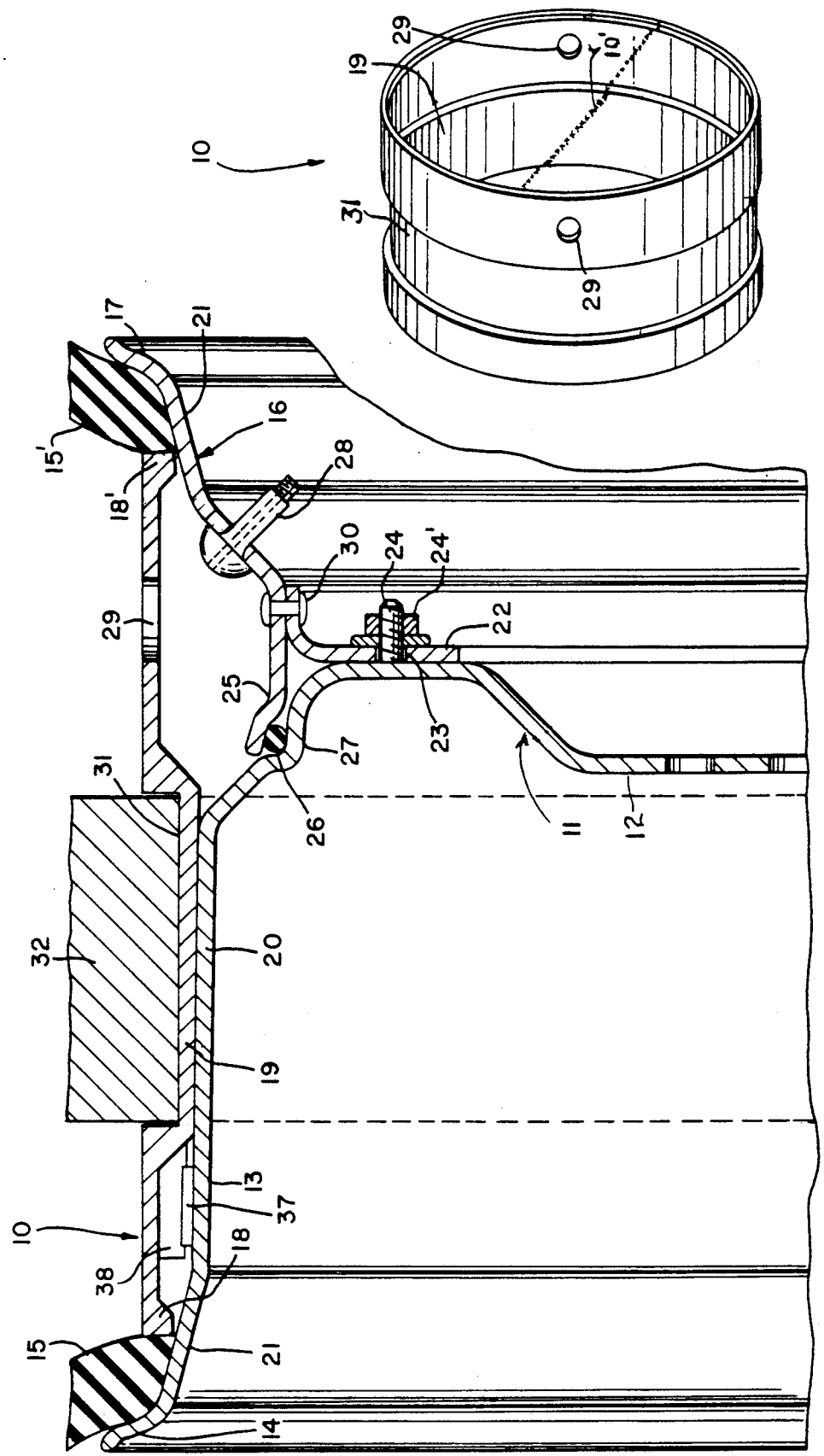
FIG. 1 is an enlarged fragmentary sectional view showing the ring member in assembled engagement with a two-part wheel rim, the beads of a mounted tire and a run-flat assemblage arranged circumferentially of the ring member.
FIG. 2 is a perspective view of the ring member detached.

As shown in the drawing, the bead-lock and run-flat assemblage mounting ring 10 comprises a unitary and circumferentially continuous metal ring of substantial width, having cross-sectional contours adapting it for close circumferential engagement with a wheel member 11, having a central hub mounting portion 12, and a ring portion 13, terminating in an outwardly extending flange 14 for one bead 15 of an associated tire. A second wheel member comprising a circumferential rim member 16 detachably secured to wheel member 11, has an additional outwardly extending flange 17 for engaging the second tire bead 15'.

The main portion of the ring member 10 is approximately ⅛" thick, with the edges 18, 18' being extended inwardly to provide edge surfaces about ¼" in radial dimension for bearing engagement with the tire beads 15, 15'. The central portion of the ring 10 is inwardly offset as seen at 19, and slightly tapered for close conforming engagement with the tapered bearing portion 20 of wheel member 11, and portions of the wheel member 11 and supplemental rim part 16 adjacent the flanges 14, 17 are shown as inclined about 15° from the horizontal, as seen at 21 for enhanced sealing engagement with the tire beads 15, 15'. This is illustrative of the most difficult bead-seating problem, and it is to be understood that the system applies equally for wheels having 5° or 15° bead seating inclination.

The supplemental rim member 16 includes at its inner periphery a radial flange 22, having a plurality of circumferentially spaced apertures 23 for detachable engagement with similarly spaced studs 24 on wheel member 11, and an inwardly extending portion 25 for engaging a sealing O-ring 26 seated in annular depression 27 in wheel member 11. The tightening of the nuts 24' on studs 24 accomplishes the triple function of sealably compressing O-ring 26, bringing bearing surfaces 19 and 20 into close interfitting engagement and applying lateral pressure against the tire beads 15, 15' as engaged by the ring edges 18, 18'.

The supplemental rim member 16 carries a conventional air valve 28, and the ring member 10 has at least one aperture, and preferably a plurality of apertures 29 equally spaced circumferentially of the ring member 10, providing free flow of air to the inside of the mounted tire. Components 22 and 25 of rim member 16 can be joined together by air sealing rivets 30, or by an annular weld at the point of juncture.

In alignment with the offset bearing portion 19 of ring member 10, the outer surface of ring member is provided with annular depression 31, approximately ¼" deep and of a width to closely but rotatably engage the run-flat assemblage 32 which circumferentially envelops the ring member 10, and which comprises the earlier mentioned arcuate members of plastic material having pivotal end portions bolted together to form a ring assembly. It will be noted in this connection that the bearing portion 19 and depression 31 of ring member 10 are spaced somewhat closer to ring edge 18 than ring edge 18' in order to align the bearing surface 19 with the bearing surface 20 of wheel part 11.

These details of the ring structure are intended to be adapted to the particular structure of the 2-part wheel rim with which the ring member is to be employed. It is to be understood in this connection that the particular interengagement between wheel member 11 and supplemental rim 16 and location of bearing portion 20 is given merely by way of illustration and not of limitation, as other types of two-part wheel structures are available to the trade.

The ring member 10 can be formed from various metals such as steel, aluminum and magnesium, and can be fashioned in various ways, including forging, rolling and extruding. Particularly effective are ring members fashioned from aluminum alloy by extruding lengths having the desired cross sectional contour as shown in FIG. 1, rolling such length to impart the desired circular contour, cutting, preferably at an angle of about 45°, to provide the desired ring diameter, and then welding the abutting cut ends as indicated at 10' to form a unitary, continuous ring member 10. The weld joint should be carefully ground and polished, at least in all bearing surfaces of ring member 10.

As for air holes 29, two diametrically opposed holes are generally preferred, although three or four holes can be employed so long as they are equally spaced circumferentially of the ring member 10, to maintain weight balance. The spaced holes 29 provide means for grasping the ring member 10 in the operation of disassembling it from wheel member 11. To this end it is desirable that the holes 29 be of such a size, and ground or polished at the edges, to permit insertion of a finger without injury. They are also used for inserting the rod of a tire iron to lift the ring from the rim.

The schematic showings in FIGS. 3 to 7 will show the steps of assembling the ring member 10, having an outside diameter of 16⅝ inches and width of 6⅝ inches, for 8¼ inch wide rims with a "flotation" type 16½" tire 33 in which the innermost diameter of the beads 15, 15' measure 16", due to the 15° bead seat taper. The ring member width will vary according to rim and tire bead widths with which it is intended to be used.

Figure 3:
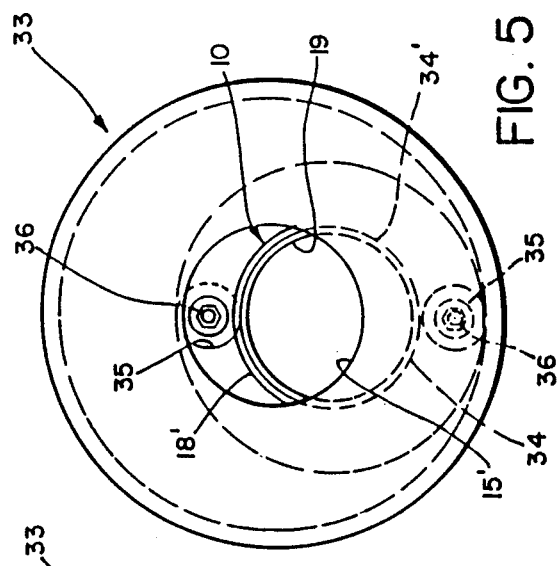
FIGS. 3 to 7 are schematic views showing the steps of creating the assemblage shown in FIG. 1.

The first step is to insert in the tire 33 the arcuate sections 34, 34' which form the run-flat assemblage 32 and to join all but one of the overlapping end portions 35, 35' with bolt means 36 as shown in FIG. 3. The embodiment illustrated shows two arcuate sections, but it is sometimes desirable to use three, or even four, similar pivotally connected sections. The assembled sections 34, 34' are then spread apart as shown in FIG. 3 to be clear of the central opening of the tire 33.

The ring 10 is now oriented perpendicularly to the plane of the tire 33 and forced through the nearest tire bead opening. Because of the relative sizes of the opening and the ring 10, as above mentioned, there is a substantial distortion of the bead opening as the maximum diameter of the ring passes therethrough. This distortion is illustrated in FIG. 3, where the 16" bead opening has been distorted to have a transverse dimension as shown of about 14 inches, and a maximum vertical dimension of about 19 inches between impinging edges of the ring member 10.

As previously mentioned, the ring dimensions must be adapted to the particular rim width and tire bead width for which it is intended to be used. Critical in adapting the ring dimensions to the selected rim and tire bead specifications is the maximum outside diameter permitted at the ring edges which will enable forced insertion of the ring member through the tire bead opening as above described. This, in turn, controls the permissable radial dimensions of the ring edges 18, 18'. In referring to this dimension as "about ¼ inch" it will be noted that the term is intended to embrace practical variations which may be slightly less than or slightly greater than ¼". Dimensions less than ¼" should be avoided if possible as reducing the effective bearing pressure against the tire beads. On the other hand, if it is possible with a particular combination of rim width and tire bead width for which the ring is being adapted to increase the radial dimension of the ring edges 18, 18' for example to ⅜" or possibly even somewhat greater, this should be done as enhancing the bearing pressure applied to the tire beads. The limiting factor in thus enlarging the radial dimension of the ring edges 18, 18' is the extent to which the tire bead opening can be distorted, without damage to the tire beads, in the assembly step above described.

Figure 4:
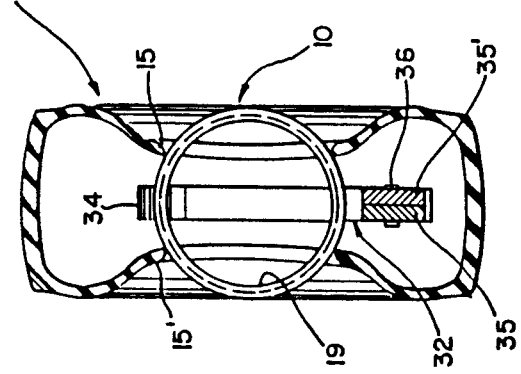

As the ring member 10 is pushed beyond the maximum bead distortion position shown in FIG. 3 it assumes the position shown in FIG. 4 involving slight spreading of the beads where engaging the ring member 10, as compared with the relaxed bead spacing shown in the background. The ring member 10 is then rotated to align it with the spacing between the tire beads 15, 15' either by hand, or with the assistance of a tire iron or other prying tool.

Care must be taken at this point to rotate the ring member 10 in the proper direction to bring the wider portion carrying the air holes 29 to the outer side of the tire because the air holes must align with the supplemental rim 16 which is at the outside of the wheel and carries air valve 28. One other bit of planning is also critical. The arcuate sections 34, 34' of the run-flat assemblage 32 must be oriented to permit attachment of the final closure bolt 36 from the outer side of the tire 33.

Figure 6:
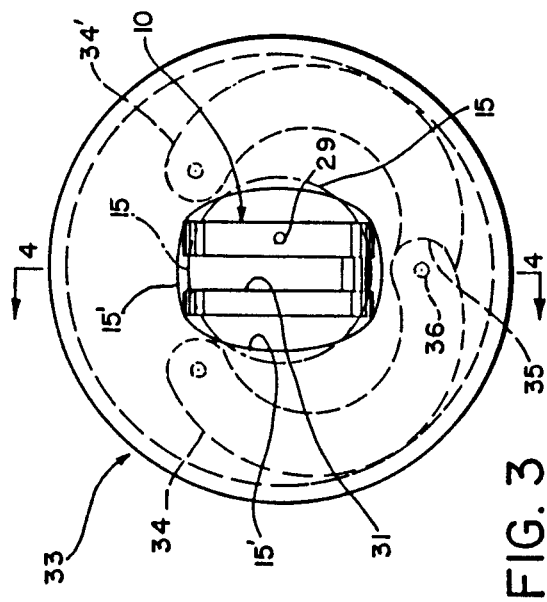
Figure 5:
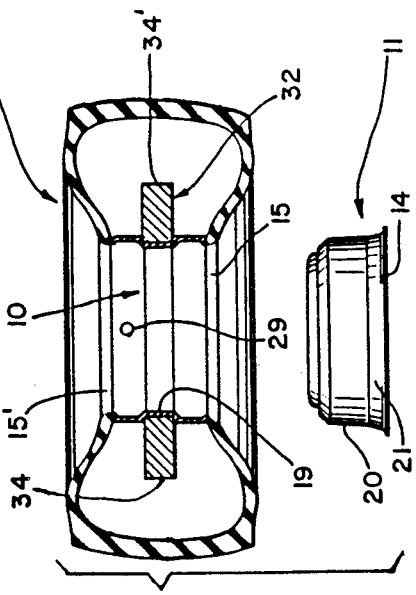

Once aligned between the tire beads 15, 15' the member 10 is moved into the tire cavity, adjacent to the closed joint of the arcuate sections, and the arcuate sections are adjusted to align with the ring depression track 31, permitting the now accessible free ends of the arcuate sections 34, 34' to be joined by the final bolt 36 as seen in FIG. 5. After tightening both (or all) bolts 36 the assemblage is moved transversely within the tire 33 to align ring number 10 with the bead opening as shown in FIG. 6.

Figure 7:
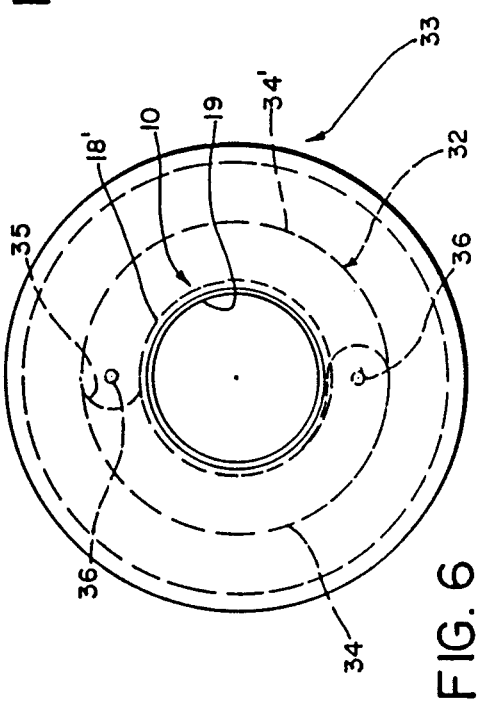

This assemblage, with the outer side of tire 33 to the operator, is then aligned with wheel member 11 as shown in FIG. 7, and slid over the wheel member until the tire bead remote from the operator engages rim bead seat area. The final steps of assembly, not illustrated involve attaching supplemental rim member 16, attaching and tightening bolts 24' bringing the tire beads into full sealing engagement with the rim flanges, and adding air to the desired pressure through air valve 28.

While the assembly steps above described may seem to be a bit involved, they can, in fact, be accomplished quickly and easily. In fact, with all components available and "ready to use", an experienced individual can accomplish all the assembly steps described within five minutes, and generally have time to spare.

The unique ring member 10, by reason of its close bearing engagement with the wheel member 11, its firm support of tire beads 15, 15' against flanges 14, 17, and its rotatable support of run-flat assemblage 32 in alignment with the bearing portion 20 of wheel member 11 provides the ultimate in durability for run-flat operation over rough terrain. It is believed, therefor, to have a tremendous potential for use in military vehicles, and for all those engaged in exploration, safaris, and other types of off-the-road travel.

While the slightly tapered interfit of wheel surface 20 with ring surface 19 is intended to provide circumferential bearing therebetween, the parts must be readily assembled and disassembled, which means that in actual practice a full circumferential interfit may not be accomplished. To the extent that there may be slight clearance between the surfaces 19 and 20 there is a tendency, when the parts become load-bearing in run-flat operation, for relative rotation of the parts (as there is relative rotation in internal gear systems).

In order to limit the extent of such relative rotation it is desirable to include on the wheel member 13, between the bearing portion 20 and the inclined bead engaging portion 21, a radially protruding lug 37, which can bear against a downwardly protruding lug 38 on the ring member 10. The lugs 37, 38 can suitably be positioned on the wheel and ring member by spot welding, or the like.

When the lugs 37 and 38 are brought into bearing contact by reason of relative rotation between the ring member 10 and wheel member 13 during run-flat operation, this will be sufficient to prevent further relative rotation, with any further tendency toward rotation being compensated for by slippage between surfaces 19 and 20.

It follows from the foregoing that when engagement has been established between lugs 37 and 38, the ring member 10 becomes, in effect, an integral part of the wheel assemblage, with all further relative movement during run-flat operation being rotational slippage of the run-flat assemblage 32 in the annular depression track 31.

Various changes and modifications in the unitary bead-lock and run-flat roller support ring as herein described may occur to those skilled in the art; and to the extent that such changes and modifications are embraced by the appended claims, it is to be understood that they constitute part of the present invention.

I claim:

1. A unitary bead-lock and run-flat roller support device for pneumatic tires on two-part wheels, said device comprising an essentially cylindrical, rigid closed ring member adapted for insertion within a pneumatic tire, having spaced mounting beads at the inner tire diameter for engagement with edge flanges of a circumferentially divided two-part wheel rim, the wheel rim providing a central bearing surface joining the flanges, in bead seating portions which are inclined the conventional 5 or 15° from the horizontal; the ring member, having an outside diameter approximately ⅝" greater than the inside diameter of the tire beads, an edge thickness of about ¼" for engagement with inner surfaces of the tire beads, and a width such as to firmly compress the tire beads in engagement with the rim flanges when the wheel is fully assembled, the central portion of the ring having an inwardly protruding smooth inner surface for close engagement with the bearing surface of the wheel, and the outer surface of the ring member having a central annular rectangular depression track about ¼" deep, said depression track being of a width to freely and rotatably receive a run-flat support roller comprising a plurality of arcuate members assembled in end-to-end relation.

2. A bead-lock and run-flat roller support device as defined in claim 1, wherein said device is fashioned from extruded metal which is rolled to circular contour and then cut and welded at an angle of about 45° to provide the closed ring of appropriate size.

3. A bead-lock and run-flat roller support device as defined in claim 2, wherein weld area is ground and polished to provide smooth continuity in all bearing surfaces.

4. A bead-lock and run-flat roller support device as defined in claim 2, wherein the metal is aluminum alloy.

5. A bead-lock and run-flat roller support device as defined in claim 2, wherein the metal is magnesium.

6. A bead-lock and run-flat roller support device as defined in claim 1, wherein the main body of the ring member has a thickness of about $\frac{1}{8}''$ with 45° reinforcing chamfers adjacent the bead engaging edges and adjacent edges of the rectangular annular depression track.

7. A bead-lock and run-flat roller support device as defined in claim 1, wherein the main body of the ring member has a thickness of about $\frac{1}{8}''$ with 45° reinforcing chamfers adjacent the bead engaging edges and adjacent edges of the rectangular annular depression track, and the thickness in alignment with said depression track varying slightly transversely of the device to provide a taper on the inner surface of the ring member interfitting with a transverse bearing surface taper on said wheel rim.

8. A bead-lock and run-flat roller support device as defined in claim 1, wherein the inwardly protruding ring portion and aligned annular depression track are positioned transversely of the device to be aligned with the bearing surface of said wheel rim.

9. A bead-lock and run-flat roller support device as defined in claim 1, wherein the inwardly protruding ring portion and aligned annular depression track are positioned transversely of the device to be aligned with the bearing surface of said wheel rim, and are somewhat closer to the inner bead engaging edge than the outer bead engaging edge of said device.

10. A bead-lock and run-flat roller support device as defined in claim 1, wherein the inwardly protruding ring portion and aligned annular depression track are positioned transversely of the device to be aligned with the bearing surface of said wheel rim, and are centered on the wheel rim.

11. A bead-lock and run-flat roller support device as defined in claim 1, wherein the space between the annular depression track and the bead engaging edge of the device, which is to be oriented at the outer side of the wheel, is provided with aperture means to provide air passage between an outer wheel part carrying an air valve and the interior of the mounted tire.

12. A bead-lock and run flat roller support device as defined in claim 11, wherein said aperture means comprises a plurality of apertures uniformly spaced circumferentially of said ring member.

13. A bead-lock and run-flat roller support device as defined in claim 1, wherein the space between the annular depression track, and the bead engaging edge of the ring member, which is to be oriented at the inside of the wheel, is provided with an inwardly protruding radial lug adapted to engage an outwardly protruding radial lug on said wheel rim, for limiting the extent of any rotary movement of the ring member on the wheel rim.

14. The combination of assembled components comprising, a unitary bead-lock and run-flat roller support device as defined in claim 1, a pneumatic tire having spaced mounting beads, a two part circumferentially divided wheel with one bead engaging flange carried by a main hub-engaging wheel part and the other bead engaging flange carried by a detachable rim flange, and a run-flat support roller within the tire casing comprising a plurality of arcuate sections joined in end-to-end relation, wherein the fully assembled components provide lateral pressure maintaining the tire beads in engagement with the rim flanges and direct bearing support of the run-flat roller on the main, hub-engaging wheel part.

15. The combination as defined in claim 14, wherein one wheel part adjacent the bead seating portion thereof carries an air valve, and the portion of the ring member aligning with said valve having aperture means providing air passage to the interior of the mounted tire.

16. The combination as defined in claim 15, wherein said aperture means comprises a plurality of air-passage apertures equally spaced circumferentially of said ring and of a size to receive a finger or other implement to facilitate disassembly of the parts.

17. The combination as defined in claim 15, wherein the run-flat support roller comprises a plurality of arcuate plastic sections with overlapping pivotal end portions secured together by bolt means accessible from the air passage side of the assemblage.

18. The combination as defined in claim 17, wherein the run-flat support roller is a two-part plastic device having pivotal end-to-end connections.

* * * * *